United States Patent [19]

Claar et al.

[11] Patent Number: 5,098,870

[45] Date of Patent: Mar. 24, 1992

[54] PROCESS FOR PREPARING SELF-SUPPORTING BODIES HAVING CONTROLLED POROSITY AND GRADED PROPERTIES AND PRODUCTS PRODUCED THEREBY

[75] Inventors: Terry D. Claar; William B. Johnson, both of Newark, Del.

[73] Assignee: Lanxide Technology Company, LP, Newark, Del.

[21] Appl. No.: 557,332

[22] Filed: Jul. 23, 1990

Related U.S. Application Data

[63] Continuation-in-part of Ser. No. 551,750, Jul. 12, 1990, which is a continuation-in-part of Ser. No. 296,961, Jan. 13, 1989, Pat. No. 5,019,539.

[51] Int. Cl.$^5$ .............................................. C04B 35/10
[52] U.S. Cl. ..................................... 501/87; 501/96; 501/127; 501/128; 501/134; 75/235; 264/65; 264/60; 423/625; 423/412; 419/2; 419/23; 419/57

[58] Field of Search ............... 501/96, 99, 102; 419/2, 419/23, 57

[56] References Cited

U.S. PATENT DOCUMENTS

| | | | |
|---|---|---|---|
| 3,758,662 | 9/1973 | Tobin | 264/332 |
| 4,471,059 | 9/1984 | Yoshino et al. | 501/96 |
| 4,595,545 | 6/1986 | Sane | 264/65 |
| 4,692,418 | 9/1987 | Boecker et al. | 501/90 |
| 4,702,770 | 10/1978 | Pyzik | 75/236 |
| 4,713,360 | 12/1987 | Newkirk et al. | 501/87 |
| 4,718,941 | 1/1988 | Halverson | 75/236 |
| 4,777,014 | 10/1988 | Newkirk et al. | 419/12 |
| 4,885,131 | 12/1989 | Newkirk | 419/12 |
| 4,891,338 | 1/1990 | Gesing et al. | 501/87 |
| 4,904,446 | 2/1990 | White et al. | 419/13 |
| 4,940,679 | 7/1990 | Claar et al. | 501/96 |
| 4,978,644 | 12/1990 | White et al. | 501/96 |
| 5,004,714 | 4/1991 | Claar et al. | |
| 5,010,044 | 4/1991 | Newkirk | 501/93 |
| 5,011,063 | 4/1991 | Claar | 228/122 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 1492477 | 11/1977 | United Kingdom . |

Primary Examiner—William R. Dixon, Jr.
Assistant Examiner—C. Melissa Bonner
Attorney, Agent, or Firm—Mark G. Mortenson; William E. McShane

[57] ABSTRACT

This invention relates generally to a novel method of preparing self-supporting bodies and to the novel products made thereby. In its more specific aspects, this invention relates to a method of producing self-supporting bodies having controlled porosity and graded properties and comprising one or more boron-containing compounds, e.g., a boride or a boride and a carbide. The method comprises, in one embodiment, reacting a powdered parent metal, in molten form, with a bed or mass comprising a boron carbide material and, optionally, one or more inert fillers, to form the body. In another embodiment, both of a powdered parent metal and a body or pool of molten parent metal are induced to react with a bed or mass comprising a boron carbide material and, optionally, one or more inert fillers. in addition, combustible additives (e.g., gelatin, corn starch, wax, etc.) can be mixed with the bed or mass comprising a boron carbide material to aid in the porisity producing process. When the self-supporting body of the instant invention is formed while in contact with a previously formed ceramic, metal or composite body, a bond can be formed between the two bodies, thus creating a macrocomposite body.

23 Claims, 4 Drawing Sheets

PROCESS FOR PREPARING SELF-SUPPORTING BODIES HAVING CONTROLLED POROSITY AND GRADED PROPERTIES AND PRODUCTS PRODUCED THEREBY

CROSS REFERENCES TO RELATED APPLICATIONS

This is a Continuation-in-Part of U.S. patent application Ser. No. which was filed on July 12, 1990, as 07/551,780, in the names of Terry Dennis Claar, et al. and entitled "A Process for Preparing Self-Supporting Bodies Having Controlled Porosity and Graded Properties and Products Produced Thereby". The above-described U.S. patent application Ser. No. 07/551,750 is a Continuation-in-Part of U.S. patent application Ser. No. 07/296,961, which was filed on Jan. 13, 1989, in the names of Terry Dennis Claar, et al. and issued on May 28, 1991, as U.S. Pat. No. 5,019,539.

FIELD OF THE INVENTION

This invention relates generally to a novel method of preparing self-supporting bodies and to the novel products made thereby. In its more specific aspects, this invention relates to a method of producing self-supporting bodies having controlled porosity and graded properties and comprising one or more boron-containing compounds, e.g., a boride or a boride and a carbide. The method comprises, in one embodiment, reacting a powdered parent metal, in molten form, with a bed or mass comprising a boron carbide material and, optionally, one or more inert fillers, to form the body. In another embodiment, both of a powdered parent metal and a body or pool of molten parent metal are induced to react with a bed or mass comprising a boron carbide material and, optionally, one or more inert fillers. In addition, combustible additives (e.g., gelatin, corn starch, wax, etc.) can be mixed with the bed or mass comprising a boron carbide material to aid in the porosity producing process. When the self-supporting body of the instant invention is formed while in contact with a previously formed ceramic, metal or composite body, a bond can be formed between the two bodies, thus creating a macrocomposite body.

BACKGROUND OF THE INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristic tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pores in the resulting ceramic structure. This creates cermets which are wettable and resistant to molten aluminum. These cermets are particularly useful in aluminum production cells as components which contact the molten aluminum produced but preferably remain out of contact with the molten cryolite. There is further no employment of boron carbide in this process.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride. There is further no suggestion of using boron carbide as a precursor material in the process.

U.S. Pat. No. 3,864,154 to Gazza, et al. discloses a ceramic-metal system produced by infiltration. An $AlB_{12}$ compact was impregnated with molten aluminum under vacuum to yield a system of these components. Other materials prepared included $SiB_6$-Al; B-Al; $B_4C$-Al/Si; and $AlB_{12}$-B-Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4C$-Al composites, a $B_4C$-Al compact (formed by cold pressing a homogeneous mixture of $B_4C$ and Al powders) is subjected to sintering in either a vacuum or an argon atmosphere. There is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

DISCUSSION OF RELATED PATENT APPLICATIONS AND PATENTS

Many of the above-discussed problems associated with the production of boride-containing materials have been addressed in commonly owned and co-pending U.S. patent application Ser. No. 551,306, filed on July 12, 1990, which was a continuation-in-part of U.S. patent application Ser. No. 446,433, filed on Dec. 5, 1989, and which issued on May 21, 1991, as U.S. Pat. No. 5,017,334 in the names of Terry Dennis Claar et al., as a continuation of commonly owned U.S. patent application Ser. No. 296,771, which issued on Dec. 5, 1989, to U.S. Pat. No. 4,885,130. U.S. patent application Ser. No. 296,771, was a continuation-in-part of U.S. patent application Ser. No. 137,044, filed on Dec. 23, 1987, and which issued on July 10, 1990, as U.S. Pat. No. 4,940,679 in the names of Terry Dennis Claar et al., which was a continuation-in-part of U.S. patent application Ser. No. 073,533, filed in the names of Danny R. White, Michael K. Aghajanian and T. Dennis Claar, on July 15, 1987, and now abandoned.

The following definitions were used in Application '533 and shall apply to the instant application as well.

"Parent metal" refers to that metal (e.g., zirconium) which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal (e.g. zirconium), the metal identified should be read with this definition in mind unless indicated otherwise by the context.

"Parent metal boride" and "parent metal boro compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of boron carbide and parent metal.

Briefly summarizing the disclosure of application '533, self-supporting ceramic bodies are produced by utilizing a parent metal infiltration and reaction process (i.e., reactive infiltration) in the presence of a boron carbide. Particularly, a bed or mass of boron carbide is infiltrated by molten parent metal, and the bed may be comprised entirely of boron carbide, thus resulting in a self-supporting body comprising one or more parent metal boron-containing compounds, which compounds include a parent metal boride or a parent metal boro carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of application '533, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in application '533, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time. Preferably, conversion of the boron carbide to the parent metal boride, parent metal boro compound(s) and parent metal carbide is at least about 50%, and most preferably at least about 90%.

The typical environment or atmosphere which was utilized in application '533 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

U.S. Pat. No. 4,940,679 which issued on July 10, 1990, from U.S. patent application Ser. No. 137,044 (hereinafter referred to as "application '044"), filed in the names of Terry Dennis Claar, Steven Michael Mason, Kevin Peter Pochopien and Danny Ray White, on Dec. 23, 1987, and entitled "Process for Preparing Self-Supporting Bodies and Products Made Thereby", is a Continuation-in-Part Application of application '533. Application '044 discloses that in some cases it may be desirable to add a carbon donor material (i.e., a carbon-containing compound) to the bed or mass of boron carbide which is to be infiltrated by molten parent metal. Specifically, it was disclosed that the carbon donor material could be capable of reacting with the parent metal to form a parent metal-carbide phase which could modify resultant mechanical properties of the composite body, relative to a composite body which was produced without the use of a carbon donor material. Accordingly, it was disclosed that reactant concentrations and process conditions could be altered or controlled to yield a body containing varying volume percents of ceramic compounds, metal and/or porosity. For example, by adding a carbon donor material (e.g., graphite powder or carbon black) to the mass of boron carbide, the ratio of parent metal-boride/parent metal-carbide could be adjusted. In particular, if zirconium was used as the parent metal, the ratio of $ZrB_2/ZrC$ could be reduced (i.e., more ZrC could be produced due to the addition of a carbon donor material in the mass of boron carbide).

Application '044 also discloses the use of a graphite mold which contains an appropriate number of through-holes having a particular size, shape and location which function as a venting means to permit the removal of, for example, any gas which may be trapped in the preform or filler material as the parent metal reactive infiltration front infiltrates the preform.

In another related U.S. patent, specifically, U.S. Pat. No. 4,915,736, which issued on Apr. 10, 1990, from application Ser. No. 137,382 (hereinafter referred to as "Application '382"), filed in the names of Terry Dennis Claar and Gerhard Hans Schiroky, on Dec. 23, 1987, and entitled "A Method of Modifying Ceramic Composite Bodies By a Carburization Process and Articles Made Thereby", additional modification techniques are disclosed. Specifically, application '382 discloses that a ceramic composite body made in accordance with the teachings of application '533 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, application '382 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5-30 volume percent, such composite body could be modified by a post-carburization treatment to result in from about 0 to about 2 volume percent, typically about $\frac{1}{2}$ to about 2 volume percent, of parent metal remaining in the composite body.

The disclosures of each of the above-discussed Commonly Owned U.S. patent applications and Patents are herein expressly incorporated by reference.

SUMMARY OF THE INVENTION

In accordance with the present invention, self-supporting ceramic bodies are produced with a controlled porosity and/or graded properties. Such control is achieved by utilizing a powdered parent metal in combination with a material comprising boron carbide. In one preferred embodiment, both a powdered parent metal and a body or pool of parent metal are used together.

Stated more specifically, a powdered parent metal is admixed in a desirable amount with a bed or mass comprising a boron carbide material and, optionally, a filler material. The mixture is heated to a temperature above the melting point of the parent metal causing the parent metal to react with the boron carbide material to form a parent metal carbide and a parent metal boride phase. Parent metals such as zirconium, titanium, hafnium, etc. can be formed into powders and mixed in varying amounts with a boron carbide material. The powdered parent metal, upon reacting with the boron carbide, will form porosity which may correspond in relative size to the powdered parent metal particles. Specifically, if relatively large powdered parent metal particles were admixed with a boron carbide material, a larger pore size would be achieved in relation to relatively smaller parent metal particles. Moreover, the relative volume fraction of particulate parent metal to the boron carbide material may also influence the amount of porosity (i.e., as the amount of particulate parent metal increases, the amount of porosity generated in a formed body may also increase).

By combining a powdered parent metal with a boron carbide material, it is possible to control a formed body such that it could be dense at one surface thereof and relatively porous at another. Such effect could be achieved by mixing relatively large particles of parent metal with the boron carbide material near the surface of the body which was desired to be relatively porous, and mixing relatively small particles of powdered parent metal with the boron carbide material at a portion of the body which was desired to be relatively dense.

In another preferred embodiment, powdered parent metal may be admixed with the boron carbide material in only a portion of the bed or mass comprising the boron carbide material. Thus, the amount of powdered parent metal provided may be insufficient to completely react all of the boron carbide material. Accordingly, in some cases it may be necessary to provide in addition to the powdered parent metal, a molten body or pool of parent metal which also reacts with the boron carbide material. Such reaction would be a reactive infiltration, as discussed above in, for example, application '533. Moreover, such reactive infiltration preferably would occur from a surface of the bed or mass comprising the boron carbide material which was substantially oppositely located from the portion of the bed or mass which contained the powdered parent metal. Specifically, if a preform of boron carbide was formed into a plate-like shape and only one side of the plate included particulate parent metal, then reactive infiltration may be induced to occur from the side of the plate which was opposite to (e.g., furthest from) the location of the particulate parent metal.

Although the invention has been described thus far with particular emphasis on using a powdered parent metal, either alone or in combination with a body or pool of parent metal, to achieve controlled porosity, it is not necessary to use a powdered parent metal in order to achieve porosity itself. Specifically, in certain embodiments of the instant invention, a body or pool of parent metal can be contacted with a bed or mass comprising boron carbide but no powdered parent metal to result in a ceramic composite body comprising a significant amount of porosity. For example, under certain conditions, a body or pool of molten titanium parent metal can be contacted with a mass comprising boron carbide but no powdered parent metal to result in a ceramic matrix composite body displaying a significant amount of porosity. However, the porosity produced when a body or pool of parent metal is used without powdered parent metal may not be as controlled or uniform as the porosity produced when powdered parent metal is utilized.

In a preferred embodiment of the instant invention, combustible additives (e.g., gelatin, corn starch, wax, etc.) are mixed with the bed or mass comprising a boron carbide material to form a reaction mixture to aid in the porosity producing process. Such additives permit the formation of an initially dense preform or mass of material comprising boron carbide and powdered parent metal which becomes porous at a temperature equal to or less than the melting temperature of the parent metal. The porosity produced by the combustion of the combustible additives is generally in addition to the porosity formed by the consumption of the powdered parent metal at the reaction temperature. Further, the use of such combustible additives can increase the extent of control over the amount and location of the porosity in the formed ceramic matrix composite body.

In another preferred embodiment of the instant invention, the porous ceramic matrix composite body may be formed while in contact with a previously formed ceramic, metal or composite body, to permit the formation of a bond between the two bodies. Thus, by utilizing this embodiment of the instant invention, a macrocomposite body can be formed which comprises a first body which is integrally attached to a porous ceramic composite body.

Bodies made according to the process of the invention which include a controlled amount of porosity, could be used for such applications as high temperature filters (especially those filters exposed to corrosive environments) as well as in biomedical applications. For example, a self-supporting body made according to the invention, and having graded porosity (i.e., a controlled variation in the porosity of one portion of the body relative to another), could be used as an artificial bone structure. Specifically, certain portions of the body could permit the penetration of bone growth and other portions of the body could permit the attachment of ligaments and/or muscles. Still further, the thermal and/or mechanical properties of the body can be controlled by controlling the amount of porosity, as well as the specific location of the porosity. For example, porosity could be designed to be in only a central portion of the body, while outer portions of the body remained relatively dense.

Accordingly, the present invention can provide bodies which can be applied in a virtually unlimited number of applications ranging from heavy industrial applications to biomedical applications.

DETAILED DESCRIPTION OF INVENTION AND PREFERRED EMBODIMENTS

Figure 1:
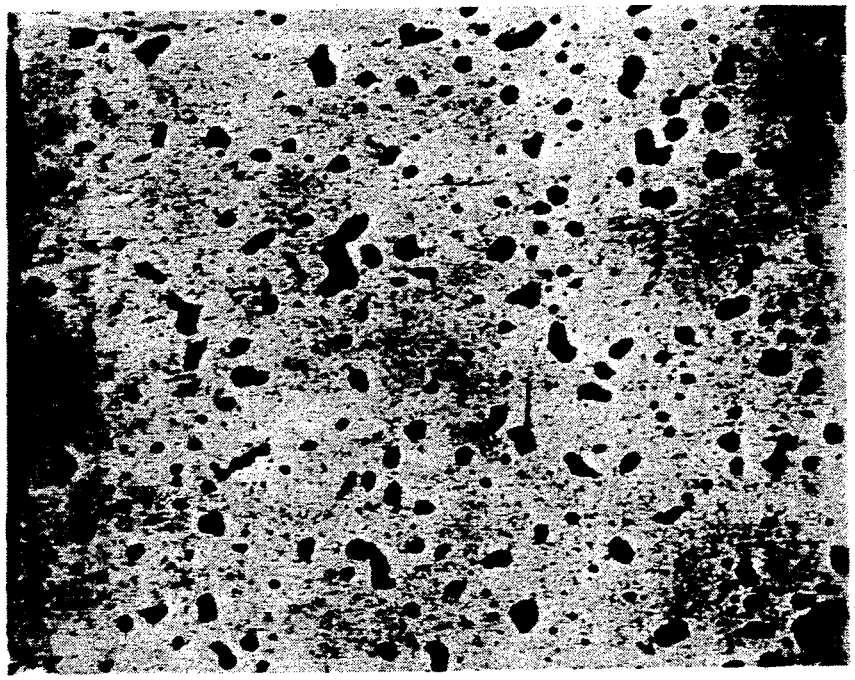
FIG. 1 is a photomicrograph at 50× magnification of a section of a ceramic composite formed by the method described in Example 1.

In accordance with the present invention, self-supporting ceramic bodies are produced with a controlled porosity (e.g., highly porous, dense, etc.) and/or graded properties. Such control is achieved by utilizing a powdered parent metal in combination with a material comprising boron carbide. In addition, a filler material may be admixed with the material comprising boron carbide. Further, in a preferred embodiment, both a powdered parent metal and a body or pool or parent metal may be used in combination.

Stated more specifically, a powdered parent metal is admixed in a desirable amount with a bed or mass of a material comprising boron carbide and, optionally, a filler material. The mixture is heated to a temperature above the melting point of the parent metal causing the parent metal to react with the boron carbide material to form a parent metal carbide and a parent metal boride phase. Parent metals such as zirconium, titanium, hafnium, etc. can be formed into powders and can be mixed in varying amounts with a boron carbide material. The powdered parent metal, upon reacting with the boron carbide, will form porosity which may correspond in relative size to the powdered parent metal particles which had previously occupied the space in the mixture. Specifically, if relatively large powdered parent metal particles were admixed with a boron carbide material, a larger pore size would be achieved in relation to the pore size which would be achieved by the use of relatively smaller parent metal particles. Moreover, the relative volume fraction of particulate parent metal to boron carbide may also influence the amount of porosity (i.e., as the amount of particulate parent metal increases, the amount of porosity generated in a formed body may also increase). Further, the relative packing of the mixture of parent metal and boron carbide may affect the porosity of the formed body. Specifically, when pressure is applied to a mixture of boron carbide and parent metal resulting in a closer packing of the particles, the porosity of the resultant body may contain a relatively lesser amount of porosity following infiltration as compared to bodies formed when no packing of the particles occurred.

By combining a powdered parent metal with a boron carbide material, it is possible to control a formed body such that it could be dense at one surface thereof and relatively porous at another surface or in another portion of the body. Such effect could be achieved by mixing relatively large particles of parent metal with boron carbide near a surface of the body which was desired to be relatively porous, and mixing relatively small particles of powdered parent metal with boron carbide at a portion of the body which was desired to be relatively dense. Moreover, by packing the particles in the mixture of parent metal and boron carbide in one portion of the mixture more densely relative to another portion of the mixture, it is possible to control the relative porosity of the body in one area of the body as compared with another area of the body. Further, a formed body could be controlled such that it could be dense at one surface and relatively porous at another by varying the amount of filler material of the same size and/or by varying the relative shape of the filler material particles in one part of the body as opposed to another part of the body.

In another preferred embodiment, two or more parent metals may be admixed in a desirable amount with a material comprising boron carbide and, optionally, a filler material. Parent metals such as zirconium, titanium, hafnium, etc. can be formed into powders and admixed in combinations of two or more (e.g., zirconium and titanium) in varying amounts with the boron carbide material. Moreover, the relative particle sizes of the admixed parent metals may be varied to influence the amount of porosity and/or the properties of the formed body. Still further, differing parent metals could be placed in different areas of the boron carbide material. Specifically, a surface or portion of a boron carbide material may contain zirconium powder, while a differing surface or portion of the boron carbide material may contain titanium powder.

In a further preferred embodiment, powdered parent metal may be admixed with boron carbide in only a portion of the bed or mass comprising the boron carbide material. Thus, the amount of powdered parent metal provided may be insufficient to completely react all of the boron carbide material. Accordingly, in some cases it may be necessary to provide in addition to the powdered parent metal, a molten body or pool of parent metal which also reacts with the boron carbide material. Such reaction would be a reactive infiltration process, as discussed in, for example, application '533. Moreover, such reactive infiltration preferably would occur from a surface of the bed or mass comprising the boron carbide material which was substantially oppositely located from the portion of the bed or mass which contained the powdered parent metal. Specifically, if a preform of boron carbide was formed into a plate-like shape and only one side of the plate included particulate parent metal, then reactive infiltration may be induced to occur from the side of the plate which was opposite (e.g., furthest from) the location of the particulate parent metal.

In a further embodiment, powdered parent metal (i.e., a single parent metal or a combination of two or more parent metals) may be admixed with boron carbide in only a portion of the bed or mass comprising the boron carbide material, thereby providing insufficient parent metal to completely react all of the boron carbide material. Accordingly, a molten body or pool of a parent metal having a different composition (e.g., a parent metal different from the parent metal, or combination of two or more parent metals, admixed with the boron carbide in the bed or mass comprising the boron carbide material) may be provided in addition to the powdered parent metal (or metals) admixed with the boron carbide.

In a still further embodiment, the particle size of the boron carbide material may be varied to control the porosity of the formed body. Specifically, by varying the particle size of the boron carbide material, either homogeneously throughout the bed or mass comprising the boron carbide material, or in a graded distribution, the porosity of the formed body may be affected. Moreover, by varying the particle size of any filler material which may be added to the bed or mass comprising the boron carbide material, the porosity of the formed body may be affected.

Although the invention has been described thus far with particular emphasis on using a powdered parent metal, either alone of in combination with a body or pool or parent metal, to achieve controlled porosity, it is not necessary to use a powdered parent metal in order to achieve porosity itself. Specifically, in certain embodiments of the instant invention, a body or pool of parent metal can be contacted with a bed or mass comprising boron carbide but no powdered parent metal to result in a ceramic composite body comprising a significant amount of porosity. For example, under certain conditions, a body or pool of molten titanium parent metal can be contacted with a mass comprising boron carbide but no powdered parent metal to result in a ceramic matrix composite body displaying a significant amount of porosity. However, the porosity produced when a body or pool of parent metal is used without powdered parent metal may not be as controlled or uniform as the porosity produced when powdered parent metal is utilized.

In a preferred embodiment of the instant invention, combustible additives (e.g., gelatin, corn starch, wax, etc.) are mixed with the bed or mass comprising a boron carbide material, to form a reaction mixture to aid in the porosity producing process. Such additives permit the formation of an initially dense preform or mass of material comprising boron carbide and powdered parent metal which becomes porous at a temperature equal to or less than the melting temperature of the parent metal. The porosity produced by the combustion of the combustible additives is generally in addition to the porosity formed by the consumption of the powdered parent metal at the reaction temperature. Further, the use of such combustible additives can increase the extent of control over the amount and location of the porosity in the formed ceramic matrix composite body.

In another preferred embodiment of the instant invention, the porous ceramic matrix composite body may be formed while in contact with a previously formed ceramic, metal or composite body, to permit the formation of a bond between the two bodies. Thus, by utilizing this embodiment of the instant invention, a macrocomposite body can be formed which comprises a first body which is integrally attached to a porous ceramic composite body.

EXAMPLE 1

A homogeneous mixture of about 10 grams of TETRABOR ® 320 grit (average particle diameter of about 32 $\mu$m) $B_4C$ powder (ESK Engineered Ceramics, New Canaan, CT) and about 70 grams of −325 mesh (particle diameter less than about 45 $\mu$m) zirconium powder (Consolidated Astronautics, Inc., Saddle Brook, NJ) was mixed by manually shaking the powders together in a Nalgene container. Approximately 20 grams of the powdered mixture was placed into a 1 inch diameter graphite crucible (ATJ grade graphite crucible from Union Carbide) and pressed with a 1 inch die to a pressure of about 5000 psi. After pressing, the thickness of the $B_4C$/zirconium preform was about 0.9 inches.

The assembly, comprising the graphite crucible and its contents, was placed into a vacuum furnace. The furnace was evacuated and backfilled with argon flowing at a rate of about 2 liters/minute, resulting in a chamber pressure of about 2 psi. The evacuation step was repeated and the system was heated under argon from room temperature to about 200° C. in about 2 hours, held for about 2 hours, heated from about 200° C. to about 350° C. at about 20° C. per hour, then heated from about 350° C. to about 450° C. in about 2 hours and from about 450° C. to about 1750° C. in about 4 hours. The temperature was maintained at about 1750° C. for about one hour, then heated from about 1750° C. to about 1900° C. in about one hour and held for about 2 hours at about 1900° C. The system was then cooled to room temperature in about 8 hours.

Figure 2:
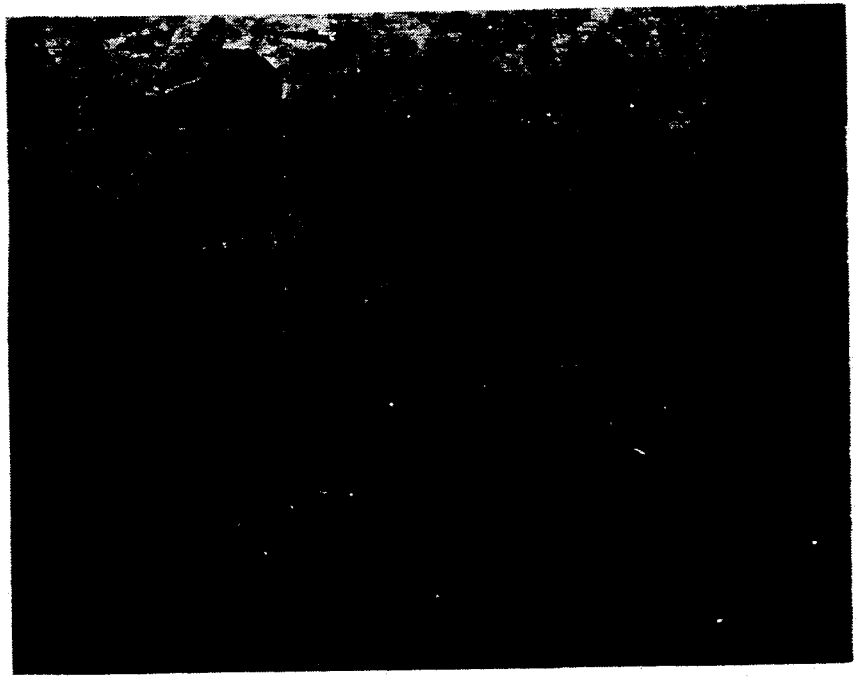
FIG. 2 is a photomicrograph at 400× magnification of a section of a ceramic composite formed by the method described in Example 1.

Upon removal from the furnace, it was observed that the zirconium had reactively infiltrated the $B_4C$ powder to form a composite body having porosity, as shown in FIGS. 1 and 2.

EXAMPLE 2

A homogeneous mixture of about 10 grams of TETRABOR ® 500 grit (average particle diameter of about 17 $\mu$m) $B_4C$ powder (ESK Engineered Ceramics, New Canaan, CT) and about 70 grams of −50 mesh (particle diameter less than about 297 $\mu$m) zirconium powder (Atlantic Equipment Engineers, Bergenfield, NJ) was mixed by manually shaking the powders together in a Nalgene container. Approximately 19.8 grams of the powdered mixture was placed into a 1 inch diameter graphite crucible (ATJ grade graphite crucible from Graphite Die Mold Co.) and pressed with a 1 inch die to a pressure of about 325 psi. After pressing, the thickness of the $B_4C$/zirconium preform was about 0.5 inches.

The assembly, comprising the graphite crucible and its contents, was placed into a vacuum furnace. The furnace was evacuated and backfilled with argon flowing at a rate of about 2 liters/minute, resulting in a chamber pressure of about 2 psi. The evacuation step was repeated, and the system was heated under argon from room temperature to about 200° C. in about 2 hours, held for about 2 hours, heated from about 200° C. to about 350° C. at about 20° C. per hour, then heated from about 350° C. to about 450° C. in about 2 hours and from about 450° C. to about 1750° C. in about 4 hours. The temperature was maintained at about 1750° C. for about one hour, then heated from about 1750° C. to about 1900° C. in about one hour and held for about 2 hours at about 1900° C. The system was then cooled to room temperature in about 8 hours.

Figure 3:
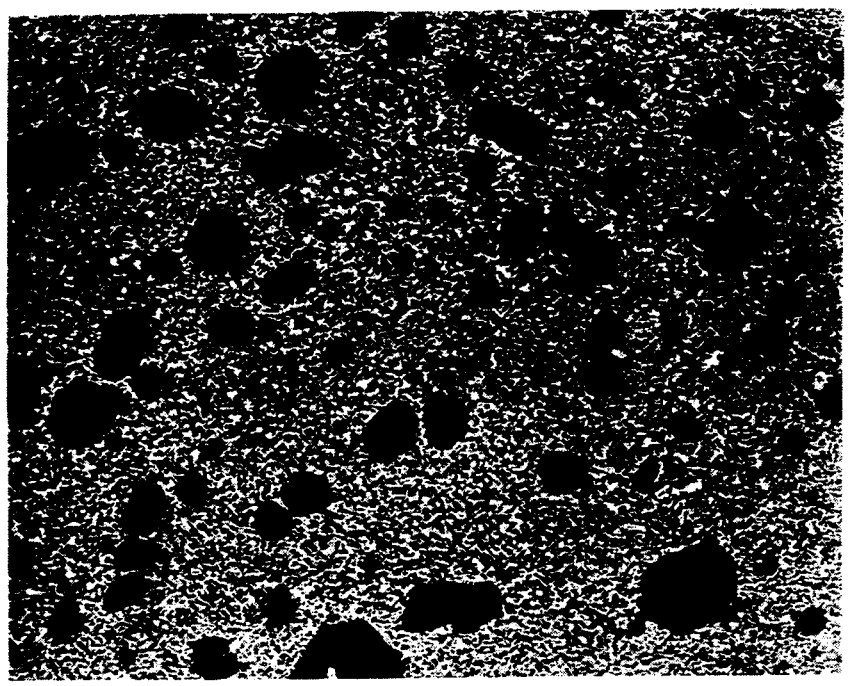
FIG. 3 is a photomicrograph at 50× magnification of a section of a ceramic composite formed by the method of Example 2.
Figure 4:
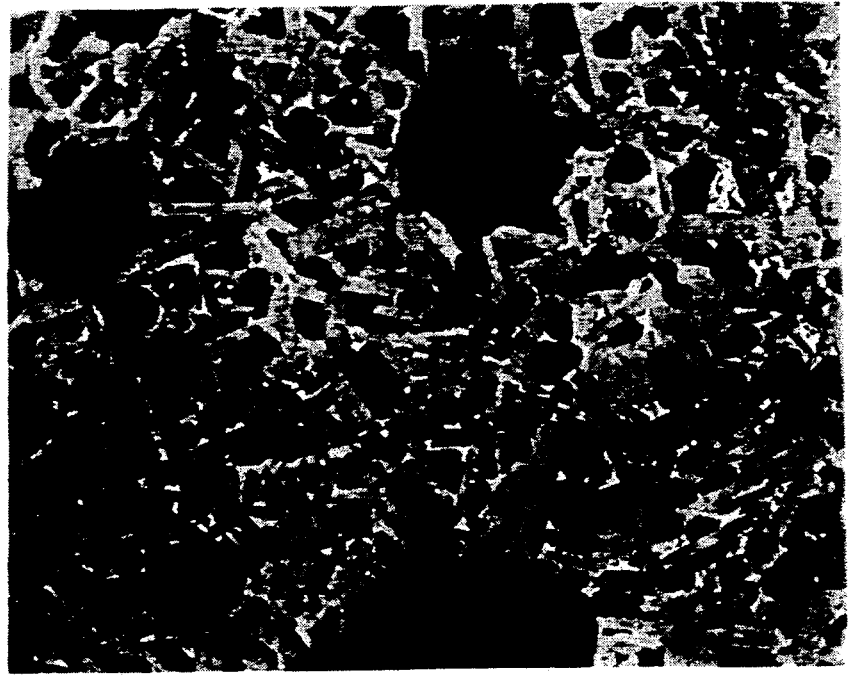
FIG. 4 is a photomicrograph at 400× magnification of a section of a ceramic composite formed by the method of Example 2.

Upon removal from the furnace, it was observed that the zirconium had reactively infiltrated the $B_4C$ powder to form a composite body having porosity, as shown in FIGS. 3 and 4.

EXAMPLE 3

A homogeneous mixture of about 9 grams of about 1000 grit (average particle diameter of about 5 $\mu$m) $B_4C$ powder (from ESK Engineered Ceramics, New Canaan, CT) and about 630 grams of −50 mesh (particle diameter less than about 297 $\mu$m) zirconium powder (Atlantic Equipment Engineers, Bergenfield, NJ) was prepared by manually shaking the powders in a Nalgene container. The mixture was loaded into a 2 inch by 2 inch by 2 inch graphite crucible (ATJ grade graphite crucible from Graphite Die Mold Co.) by tapping the powder manually to a thickness of about 0.35 inches.

The assembly, comprising the graphite crucible and the contents, was placed in a vacuum furnace. The furnace was evacuated and backfilled with argon flowing at a rate of about 2 liters/minute, resulting in a chamber pressure of about 2 psi. The evacuation step was repeated, and the system was heated under vacuum to about 1000° C. At a temperature of about 1000° C., argon was flowed into the furnace at a rate of about 2 liters/minute. The system was then ramped to about 1900° C., the time required to heat the system from room temperature to about 1900° C. being about 10 hours. The temperature was held at about 1900° C. for about 2 hours, then the furnace was ramped down to room temperature in about 12 hours.

Upon removal from the furnace, it was observed that the zirconium had reactively infiltrated the $B_4C$ powder to form a composite body comprising zirconium boride and zirconium carbide and exhibiting porosity.

EXAMPLE 4

The following Example demonstrates a method for forming titanium carbide — titanium boride — titanium ceramic matrix composite bodies having a variety of strengths and porosities by manipulating the particle size of the parent metal powder and the ratio of the parent metal powder weight to the solid oxidant weight (e.g., $B_4C$).

Table I contains a summary, for Sample A through Sample J, of the solid oxidant size and composition, the parent metal powder size and composition, the parent metal weight to solid oxidant weight ratio, the volume percent porosity in the resultant composite body, and the flexural strength of the resultant composite body expressed in megapascals.

About 25 grams of TETRABOR ® 500 grit (average particle diameter of about 17 μm) boron carbide (ESK Engineered Ceramics, New Canaan, CT) were placed into a plastic bottle with one of the following titanium parent metal powders: −50 mesh (particle diameter less than about 287 μm) titanium parent metal powder (Atlantic Equipment Engineers, Bergenfield, NJ); −80 mesh, +325 mesh (particle diameter between about 45 μm and about 177 μm) titanium parent metal powder (Chemalloy Company, Bryn Mawr, PA); and −100 mesh, +200 mesh (particle diameter between about 75 μm and about 150 μm) titanium parent metal (Consolidated Astronautics Inc., Saddle Brook, NJ). The amount of the titanium parent metal powder used was sufficient to give the parent metal powder weight to solid oxidant weight ratio listed in Table I. The $B_4C$-Ti mixtures were carefully mixed to produce a substantially homogeneous mixture and then poured into graphite molds having an inner cavity measuring about 3 inches long (76 mm), about 3 inches wide (76 mm), about 3.25 inches (83 mm) in height, and a wall thickness of about 0.25 inch (6.4 mm). The graphite molds were machined from Grade ATJ graphite (Union Carbide Corporation, Carbon Products Division, Cleveland, OH).

After the graphite molds were filled with the respective $B_4C$-Ti mixtures and lightly tapped, the graphite molds and their contents were placed into a graphite tray to form a lay-up.

The lay-up and its contents were placed into a vacuum furnace and the vacuum furnace door was closed. At about room temperature, the vacuum furnace chamber was evacuated to about $2 \times 10^{-4}$ torr. After the vacuum pump was disengaged from the vacuum furnace chamber, the vacuum furnace chamber was filled with argon at a flow rate of about 10 liters per minute until an over pressure of about 2 pounds per square inch (0.14 kg/cm$^2$) was obtained. The argon flow rate was then decreased to about 2 liters per minute. After the argon flow rate had been reduced to about 2 liters per minute, the furnace and its contents were heated from about room temperature to about 1800.C in about 9 hours, held for about 1 hour at about 1800° C., and cooled from about 1800° C. to about room temperature in about 8 hours. At about room temperature, the vacuum furnace door was opened and the lay-up was removed. Inspection revealed that each individual graphite mold that had previously contained a $B_4C$-Ti mixture had reacted to form a porous ceramic matrix composite body comprised of titanium carbide, titanium boride, titanium metal and porosity. Several of the resultant ceramic matrix composite bodies were characterized by mechanical testing and optical microscopy. Specifically, the characterization included measuring the volume percent porosity in the resultant ceramic matrix composite body and the flexural strength of the ceramic matrix composite body.

The volume fraction of porosity of a ceramic matrix composite body was determined by quantitative image analysis. A representative sample of the ceramic matrix composite body was mounted and polished. The polished sample was placed on the stage of a Nikon MICROPHOT-FX optical microscope (Nikon Inc., Garden City, NY) equipped with a DAGE-MTI series 68 video camera (Michigan City, IN) on the top port. The video camera signal was sent to a Model DV-4400 Scientific Optical Analysis System (Lamount Scientific, State College, PA). At an appropriate magnification, at least 10 video images of the microstructure were acquired through the optical microscope and stored in the optical analysis system computer memory. The video images acquired at about $100 \times$, and in some cases at about $200 \times$, were digitally manipulated to even the lighting. Video images acquired at about $200 \times$ to about $1000 \times$ required no digital manipulation to even the lighting. On video images with even lighting, specific color and gray level intensity ranges were assigned to specific microstructural features (e.g., specific components of the composite body, the residual parent metal, porosity, etc.). To verify that the color and intensity assignments were accurate, a comparison was made between the video image with color and intensity assignments and the originally acquired video image. If discrepancies were noted, corrections were made to the video image assignments by using a hand held digitizing pen and a digitizing board. Representative video images with assignments were analyzed automatically by the computer software contained in the optical analysis system to give area percent reaction product, area percent parent metal and area percent porosity, which are substantially the same as volume percents.

The flexural strength of bars cut from the ceramic composite bodies was measured using the procedure defined by the Department of Army's Proposed Standard MIL-STD-1942A (November 21, 1983). This test was specifically designed for high performance ceramic materials. The flexural strength is defined in this standard as the maximum outer fiber stress at the time of failure. A four-point-¼ point flexural test was used. The height and the width of the test specimens were measured with a precision of about 0.01 mm. The test specimens were subjected to stress applied at four-points by two lower span bearing points and two upper span bearing points. The lower span bearing points were approximately 40 millimeters apart, and the upper span bearing points were approximately 20 millimeters apart. The distances between the bearing points were determined and recorded for each individual flexural strength measurement with a precision of about 0.01 mm. The upper span was centered over the lower span, so that the load was applied symmetrically. All of the specimens had widths measuring between about 5.9 and about 6.0 mm and the heights measuring between about 2.5 and about 2.8 mm. The test specimens were obtained by cutting (e.g., diamond sawing, EDM Machining, etc.) the specimens from the ceramic matrix composite bodies which were formed according to the above discussion.

TABLE I

| Sample | Solid Oxidant Size & Composition | Parent Metal Powder Size & Composition | Parent Metal to Solid Oxidant Ratio | Composite Porosity Volume % | Composite Flexural Strength (MPa) |
| --- | --- | --- | --- | --- | --- |
| A | 500 grit[1] B$_4$C | −50 mesh Ti (d ≦ 287 μm) | 5.7 | 44.1 ± 7.9 | 103 ± 4 |
| B | 500 grit B$_4$C | −50 mesh Ti (d ≦ 287 μm) | 7.0 | 17.5 | — |
| C | 500 grit B$_4$C | −80 mesh, +325 mesh Ti (45 μm ≦ d ≦ 177 μm) | 5.7 | 44.6 ± 5.9 | 211 ± 18 |
| D | 500 grit B$_4$C | −80 mesh, +325 mesh (45 μm ≦ d ≦ 177 μm) | 7.0 | 19.0 | — |
| E | 500 grit B$_4$C | −100 mesh, +200 mesh Ti (75 μm ≦ d ≦ 150 μm) | 5.7 | 21.3 ± 2.1 | 227 ± 36 |
| F | 500 grit B$_4$C | −100 mesh, +200 mesh Ti (75 μm ≦ d ≦ 150 μm) | 7.0 | 22.3 | — |
| G | 500 grit B$_4$C | −80 mesh, +325 mesh (45 μm ≦ d ≦ 177 μm) | 5.7 | 54.8 ± 2.9 | 132.7 ± 29.0 |
| H | 500 grit B$_4$C | −80 mesh, +325 mesh Ti (45 μm ≦ d ≦ 177 μm) | 5.7 | — | 127.0 ± 19.4 |
| I | 500 grit B$_4$C | −50 mesh Ti (d ≦ 287 μm) | 5.7 | 53.9 | — |
| J | 500 grit B$_4$C | −8 mesh, +100 mesh Ti (150 μm ≦ d ≦ 2380 μm) | 5.7 | — | — |

[1]500 grit material has an average particle diameter of about 17 μm
d = approximate range of particle diameters

EXAMPLE 5

The following Example further demonstrates a method for forming a porous ceramic matrix composite body by combining a parent metal powder and a solid oxidant powder in a preform, heating the preform to an elevated temperature in an inert atmosphere, and reacting the parent metal powder and the solid oxidant contained within the preform to form a ceramic matrix composite body.

About 197 grams of a −325 mesh (particle diameter less than about 45 μm) titanium parent metal powder (Consolidated Astronautics, Saddle Brook, NJ) and about 27 grams of TETRABOR ® 1000 grit (average particle diameter of about 5 μm) boron carbide powder (ESK Engineered Ceramics, New Canaan, CT) were combined in a steel jar. After the lid to the steel jar was secured, the steel jar and its contents were placed on a jar mill for about 0.5 hour to form a homogeneous powder mixture of Ti and B$_4$C. After the steel jar containing the Ti-B$_4$C mixture was removed from the jar mill, the Ti-B$_4$C mixture was poured into a steel die having an opening measuring about 2 inches (51 mm) long and about 2 inches (51 mm) wide. The Ti-B$_4$C mixture was leveled by vibrating the Ti-B$_4$C mixture filled die. After the Ti-B$_4$C mixture was substantially level, the ram to the die was placed into the die cavity and the die with the ram was placed onto a press. The press engaged the ram of the steel die to consolidate the Ti-B$_4$C mixture into a preform. A pressure of about 10,000 lbs per square inch (703 kg/cm$^2$) was used to form the Ti-B$_4$C preform. After the Ti-B$_4$C preform was removed from the steel die, the Ti-B$_4$C preform was placed into the bottom of a graphite boat having an inner cavity measuring about 2 inches (51 mm) long, about 2 inches (51 mm) wide, about 3.25 inches (83 mm) deep and having a wall thickness of about 0.25 inch (6.4 mm). The graphite boat was machined from a piece of Grade ATJ graphite (Union Carbide Corporation, Carbon Products Division, Cleveland, OH). The graphite boat was then placed onto a graphite tray to form a lay-up.

Figure 5:
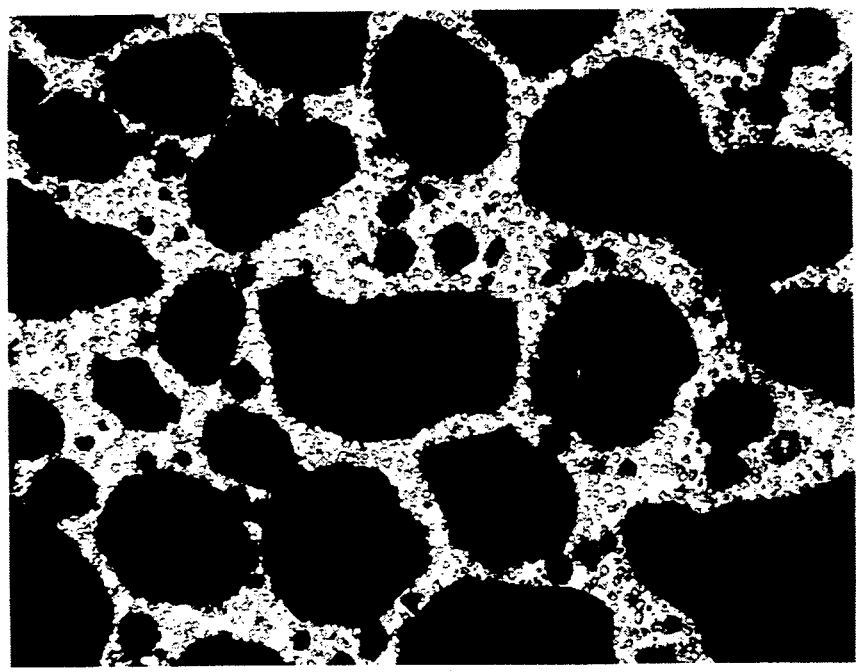
FIG. 5 is a photomicrograph at 25× magnification of a section of the ceramic matrix composite formed by the method of Example 5.

The lay-up and its contents were placed into a vacuum furnace and the vacuum furnace door was closed. The vacuum furnace chamber was then evacuated to about 2×10−4 torr and the vacuum furnace and its contents were heated from about room temperature to about 1000° C. at about 400° C. At about 1000° C., argon was introduced into the vacuum furnace chamber at a rate of about 10 liters per minute. After a vacuum furnace chamber pressure of about 2 pounds per square inch (0.14 kg/cm$^2$) was attained, the argon flow rate was reduced from about 10 liters per minute to about 2 liters per minute and the vacuum furnace and its contents were heated from about 1000° C, to about 1900° C. at about 400° C. After about 2 hours at about 1900° C. with an argon flow rate of about 2 liters per minute and a vacuum furnace chamber pressure of about 2 pounds per square inch (0.14 kg/cm$^2$), the vacuum furnace and its contents were cooled to about room temperature at about 350° C. per hour. At about room temperature, the vacuum furnace door was opened and the lay-up removed to reveal that the titanium parent metal powder had reacted with the boron carbide to form a porous ceramic matrix composite body. Specifically, FIG. 5 is a photomicrograph taken at a magnification of about 25× of a cross-section of the porous ceramic matrix composite body. The large dark areas shown in FIG. 5 correspond to the large pores in the porous ceramic matrix composite body.

EXAMPLE 6

The following Example further demonstrates a method for forming a porous ceramic matrix composite body by reacting a powdered parent metal with a powdered solid oxidant.

Moreover, this Example demonstrates that the incorporation of a combustible additive to the parent metal powder-solid oxidant mixture may be used to form a porous ceramic matrix composite body.

Table II contains a summary, for Sample K through Sample N, of the solid oxidant size and composition, the parent metal powder size and composition, the combustible additive, the parent metal powder weight to solid oxidant weight ratio, the volume percent of the porosity of the resultant porous ceramic matrix composite body, and the flexural strength of the resultant ceramic matrix composite body.

About 25 grams of TETRABOR ® 500 grit (average particle diameter of z about 17 μm) boron carbide powder (ESK Engineered Ceramics, New Canaan, CT), and about 142 grams of −8 mesh, +200 mesh (particle diameter between 150 μm to about 2380 μm) titanium parent metal powder (Chemalloy Company, Bryn Mawr, PA), were combined in each of the four plastic bottles. For Sample K, Sample L and Sample M about 1 gram of KNOX ® original unflavored gelatin (Knox Gelatin, Inc., Englewood Cliffs, NJ), ARGO PURE ® corn starch (CPC International, Inc., Englewood Cliffs, NJ), and Carnauba No. 1 yellow wax (Fisher Scientific, Pittsburgh, PA), respectively, were added to the plastic bottles and the plastic bottles were closed. For Sample N, no such additive was made. The Ti-B$_4$C-additive mixtures and the Ti-B$_4$C mixture were blended until substantially homogeneous mixtures were formed. The mixtures were then placed into a graphite mold having an inner cavity measuring about 3 inches long, about 3 inches wide, about 3.25 inches (83 mm) high and having a wall thickness of about 0.25 inch (6.4 mm). The graphite molds were machined from Grade ATJ graphite (Union Carbide Corporation, Carbon Products Division, Cleveland, OH). The mixtures within the graphite molds were substantially leveled and a ram measuring about 3 inches (76 mm) long, and about 3 inches (76 mm) wide was placed into the inner cavity of the graphite mold and contacted with the Ti-B$_4$C-additive mixtures. The graphite molds were then taken individually and placed onto a press. The ram, which was within the graphite mold and contacting the Ti-B$_4$C-additive mixture, was subjected to about 9000 lbs of force to produce a pressure of about 1000 pounds per square inch (70.3 kg/cm$^2$) to consolidate the Ti-B$_4$C-additive mixture. After the force was removed from the ram, the graphite mold and its contents were placed into a graphite tray to form a lay-up.

The lay-up and its contents were then placed into a vacuum furnace and the vacuum furnace door was closed. The vacuum furnace chamber was then evacuated to about 2×10−4 torr and after about 45 minutes the vacuum furnace chamber was filled with argon at a flow rate of about 10 liters per minute. After the vacuum chamber reached an overpressure of about 2 pounds per square inch (0.14 kg/cm$^2$), the flow rate of the argon gas was reduced to about 2 liters per minute while maintaining the over pressure of about 2 pounds per square inch (0.14 kg/cm$^2$). The furnace and its contents were then heated from about room temperature to about 1800° C. in about 9 hours, held for about 1 hour at about 1800° C., and then cooled from about 1800° C. to about room temperature in about 8 hours. At about room temperature, after interrupting the flowing argon, the furnace door was opened and the lay-up and its contents were removed to reveal that the titanium parent metal powder had reacted with the boron carbide solid oxidant to form porous ceramic matrix composite bodies. The resultant porous ceramic matrix composite bodies were then further characterized with quantitative image analysis and flexural strength measurements. The methods of Example 4 were substantially repeated in order to determine the volume percent porosity in the ceramic matrix composite bodies and the flexural strength of the ceramic matrix composite bodies.

TABLE II

| Sample | Solid Oxidant Size & Composition | Parent Metal Powder Size & Composition | Combustable Additive and Amount | Parent Metal to Solid Oxidant Ratio | Composite Porosity Volume % | Composite Flexural Strength (MPa) |
| --- | --- | --- | --- | --- | --- | --- |
| K | 500 grit[1] B$_4$C | −8 mesh, +100 mesh Ti (150 μm ≦ d ≦ 2380 μm) | gelitine | 5.7 | 50.9 ± 9.5 | 174.2 ± 17.2 |
| L | 500 grit B$_4$C | −8 mesh, +100 mesh Ti (150 μm ≦ d ≦ 2380 μm) | corn starch | 5.7 | 49.8 ± 5.1 | 175.1 ± 10.4 |
| M | 500 grit B$_4$C | −8 mesh, +100 mesh Ti (150 μm ≦ d ≦ 2380 μm) | wax | 5.7 | 62.7 ± 8.0 | 155.6 ± 3.4 |
| N | 500 grit B$_4$C | −8 mesh, +100 mesh Ti (150 μm ≦ d ≦ 2380 μm) | none | 5.7 | 55.8 ± 6.6 | 157.2 ± 2.5 |

[1]500 grit material has an average particle diameter of about 17 μm
d = approximate range of particle diameters

EXAMPLE 7

The following Example demonstrates a method for forming a ceramic matrix composite body by a two-step process. Specifically, this Example shows the formation of a first ceramic composite body and the subsequent in situ attachment of a second porous ceramic matrix composite body to the first ceramic composite body.

About 16.4 grams of isopropanol and about 0.1 gram of XUS 40303.00 tertiary amide polymer ceramic binder (Dow Chemical Corporation, Midland, MI) were combined in a plastic bottle. The plastic bottle was closed by securing the lid of the plastic bottle. Tape was wrapped around the perimeter of the lid to seal the isopropanol tertiary amide polymer mixture within the plastic bottle. The plastic bottle was then placed on a reciprocating shaker for about an hour to dissolve the tertiary amide polymer into the isopropanol solvent. Once the tertiary amide polymer was substantially completely dissolved within the solvent, about 19 grams of TETRABOR ® 1000 grit (average particle diameter of about 5 μm) boron carbide powder (ESK Engineered Ceramics, New Canaan, CT) were added to the solvent tertiary amide polymer solution. Additionally, at least 3 alumina milling balls having a diameter of about 0.5 (13 mm) were placed within the plastic bottle. The lid of the plastic bottle was then resecured and again sealed with tape. The plastic bottle was returned to the reciprocating shaker until a substantially homogeneous slurry mixture having substantially no agglomerates had formed (about 2 hours). The slurry mixture was then cast into a graphite mold having an inner cavity measuring about 2 inches (51 mm) long, about 2 inches (51 mm) wide, about 3.25 inches (83 mm) deep and having a wall thickness of about 0.25 inch (6.4 mm). The graphite mold was made from Grade ATJ graphite (Union Carbide Corporation, Carbon Products Division, Cleveland, OH). The graphite mold and its contents were then placed in a laboratory hood to allow the evaporation of the isopropanol. After at least 15 hours under the laboratory hood, the graphite mold and its contents were placed in a forced air oven set at about 45° C. for about an hour and then into a second forced air oven set at about 70° C. for about 2 hours. The weight of the graphite crucible and its contents were constantly monitored during the 45° C. drying and the 70° C. drying in order to establish that no additional weight loss had occurred. Once the graphite mold and its contents attained a constant weight in the forced air oven set at about 70° C., the graphite mold and its contents were placed into an evacuable furnace and the evacuable furnace door was closed. The evacuable furnace chamber was then evacuated and filled with argon at a flow rate of about 2 liters per minute. The evacuable furnace and its contents were then heated from about room temperature to about 200° C. in about 2 hours, from about 200° C. to about 350° C. at about 20° C. per hour, from about 350° C. to about 670° C. in about 5 hours and cooled from about 670° C. to about room temperature in about 8 hours during which time the tertiary amide polymer had been substantially completely removed from the boron carbide solid oxidant preform.

About 128 grams of ¼, +20 mesh (particle diameter between about 850 μm to about 6300 μm) zirconium sponge (Western Zirconium, Ogden, UT) was placed onto the boron carbide preform contained within the graphite boat. The graphite boat and its contents were then placed on a graphite tray to form a lay-up.

The lay-up and its contents were placed into a vacuum furnace and the furnace door was closed. The vacuum furnace chamber was evacuated for about 1 hour and then filled with commercially pure argon at about 10 liters per minute. The vacuum furnace chamber was again evacuated to about $3 \times 10^{-5}$ torr. The vacuum furnace and its contents were then heated from about room temperature to about 1000° C. in about 4 hours while maintaining a vacuum less than about 60 millitorr. At about 1000° C., the vacuum pump was disengaged from the vacuum furnace chamber and commercially pure argon was introduced into the vacuum furnace chamber at a rate of about 10 liters per minute until an over pressure of about 2 pounds per square inch (0.14 kg/cm²) was attained. The argon flow rate was then reduced to about 2 liters per minute. The vacuum furnace and its contents were then heated from about 1000° C. to about 2000° C. in about 5 hours, held for about 2 hours at about 2000° C., cooled from about 2000° C. to about 1500° C. in about 4 hours and from 1500° C. to about room temperature in another 4 hours. At about room temperature, the vacuum furnace door was opened and the lay-up was removed to reveal that a ceramic composite had formed by the reactive infiltration of the zirconium parent metal into the boron carbide solid oxidant thereby forming a ceramic matrix composite body.

The resultant ceramic matrix composite body contained within the bottom of the graphite mold was then covered with about 0.14 inches (3.6 mm) of TETRABOR ® 100 grit (average particle diameter of about 150 μm), boron carbide powder (ESK Engineered Ceramics, New Canaan, CT). A parent metal ingot comprised of Grade 2 titanium (Titanium Industries, Fairfield, NJ) weighing about 65.2 grams was placed on the surface of the boron carbide powder within the graphite mold. The graphite mold and its contents were placed on a graphite tray to form a lay-up.

The lay-up and its contents were then placed into a vacuum furnace and the vacuum furnace door was closed. The vacuum furnace chamber was then evacuated, filled with commercially pure argon and evacuated a second time to about $8 \times 10^{-4}$ torr. The vacuum furnace and its contents were then heated from about room temperature to about 1000° C. in about 4 hours while maintaining a vacuum less than about 60 millitorr. At about 1000° C., argon was introduced into the vacuum chamber at about 10 liters per minute until an over pressure of about 2 pounds per square inch (0.14 kg/cm²) was attained. The argon flow rate was then reduced to about 2 liters per minute. The vacuum furnace and its contents were then heated from about 1000° C. to about 2000° C. in about 5 hours while maintaining a flowing argon atmosphere of about 2 liters per minute and an over pressure of about 2 pounds per square inch (0.14 kg/cm²). After about 2 hours at about 2000° C., the vacuum furnace and its contents were cooled to about 1500° C. in about 4 hours and from about 1500° C. to about room temperature in about another 4 hours. At about room temperature, the vacuum furnace was opened and the lay-up was removed. The graphite mold was removed from the resultant ceramic matrix composite body. Specifically, the ceramic matrix body was cut in half to reveal that a porous titanium carbide/titanium boride body had formed and attached to the first ceramic matrix composite body thereby forming an integral macrocomposite.

EXAMPLES 8–19

The following examples were each conducted in substantially the same manner, with the difference between the Examples comprising the size of the powders which were utilized to form the mixture. In this Example, about 10 grams of a B₄C powder and about 70 grams of a zirconium powder were mechanically mixed. The mixture was loaded into an about 1-inch in diameter ATJ grade graphite crucible and tapped mechanically to level the powder.

The assembly, comprising the graphite crucible and its contents, was placed into a vacuum/inert atmosphere graphite resistance heated furnace. The furnace was twice evacuated and backfilled with argon gas which was left flowing at a rate of about 2 liters/minute. The furnace was heated from room temperature to about 1750° C. in about 4 hours, held there for about one hour, heated further to about 1900° C. in about one hour, held at about 1900° C. for about 2 hours and then cooled down to room temperature in about 8 hours. Upon removal from the furnace, it was observed that the zirconium had reacted with the B₄C powder to form a composite body comprising zirconium boride and zirconium carbide. Table III below lists the powder sizes utilized. Specifically, the amount of porosity in the formed ZBC composite was determined by conducting a quantitative image analysis. It was observed that the particle size (e.g., mesh size of the zirconium powder) was related to the porosity in the formed ZBC composite. Table IV correlates the percent porosity in the composites formed in these examples as a function of zirconium and boron carbide particle sizes. Specifically, the porosity in a formed body tends to increase with increasing zirconium and B₄C powder size.

TABLE III

| Example Number | B₄C Powder Size | Zr Powder Size |
|---|---|---|
| 8 | 320 grit[a] | −50 mesh[b] |
| 9 | 500 grit[c] | −50 mesh |
| 10 | 1000 grit[d] | −50 mesh |
| 11 | 320 grit | −100 mesh[e] |
| 12 | 500 grit | −100 mesh |
| 13 | 1000 grit | −100 mesh |
| 14 | 320 grit | −200 mesh[f] |
| 15 | 500 grit | −200 mesh |
| 16 | 1000 grit | −200 mesh |
| 17 | 320 grit | −325 mesh[g] |
| 18 | 500 grit | −325 mesh |
| 19 | 1000 grit | −325 mesh |

Notes:
[a] from ESK Engineered Ceramics, New Canaan, CT, average particle diameter of about 32 $\mu$m;
[b] from Atlantic Equipment Engineers, Bergenfield, NJ, particle diameter less than about 297 $\mu$m;
[c] from ESK Engineered Ceramics, New Canaan, CT, average particle diameter of about 17 $\mu$m;
[d] from ESK Engineered Ceramics, New Canaan, CT, average particle diameter of about 5 $\mu$m, dried at about 110° C. for about 28 hours;
[e] from Consolidated Astronautics, Inc., Saddle Brook, NJ, (−100 mesh, +200 mesh), particle diameter between about 75 $\mu$m and about 149 $\mu$m;
[f] from Consolidated Astronautics, Inc., Saddle Brook, NJ, (−200 mesh, +325 mesh), particle diameter between about 45 $\mu$m and about 75 $\mu$m;
[g] from Consolidated Astronautics, Inc., Saddle Brook, NJ, (−325 mesh), particle diameter less than about 45 $\mu$m.

TABLE IV

% POROSITY IN POROUS ZBC BODIES
Zirconium Particle Size

| Boron Carbide Particle Size | −50[k] mesh | −100[m] mesh | −200[n] mesh | −325[o] mesh |
|---|---|---|---|---|
| 320 grit[h] | approx. 60% inhomogeneous distribution | 31.3 ± 3.1% | 25.1 ± 4.6% | 8.7 ± 0.8% |
| 500 grit[i] | 41.0 ± 4.3% | 7.5 ± 2.0% | 5.4 ± 1.0% | 6.2 ± 1.2% |
| 1000 grit[j] | 13.9 ± 2.1% | 12.6 ± 2.6% | 5.3 ± 1.0% | 3.9 ± 1.6% |

Notes:
[h] average particle diameter of about 32 $\mu$m;
[i] average particle diameter of about 17 $\mu$m;
[j] average particle diameter of about 5 $\mu$m;
[k] particle diameter less than about 279 $\mu$m;
[m] particle diameter less than about 149 $\mu$m;
[n] particle diameter less than about 75 $\mu$m;
[o] particle diameter less than about 45 $\mu$m.

Figure 6:
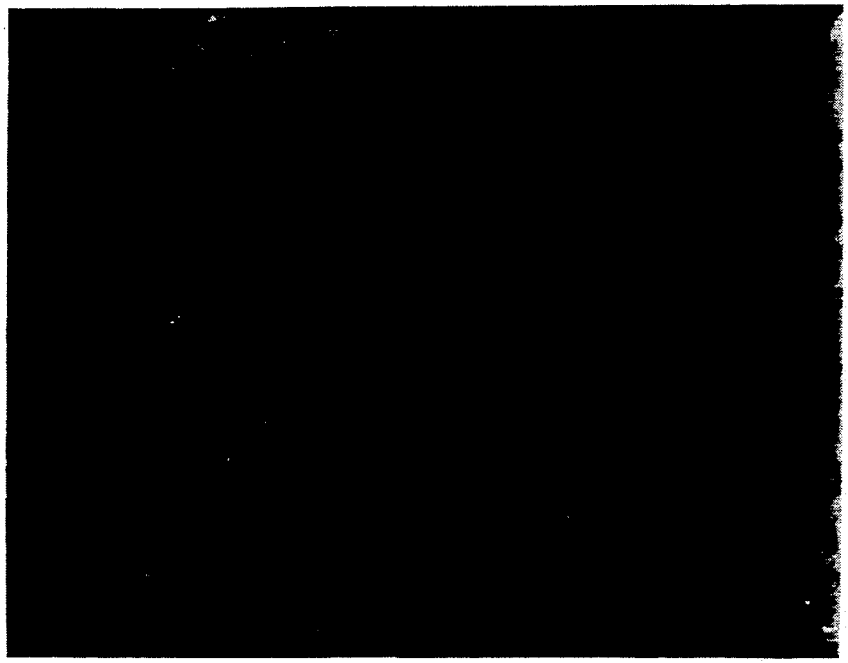
FIG. 6 is a photomicrograph at 400× magnification of a section of the ceramic matrix composite formed by the method of Example 11.
Figure 7:
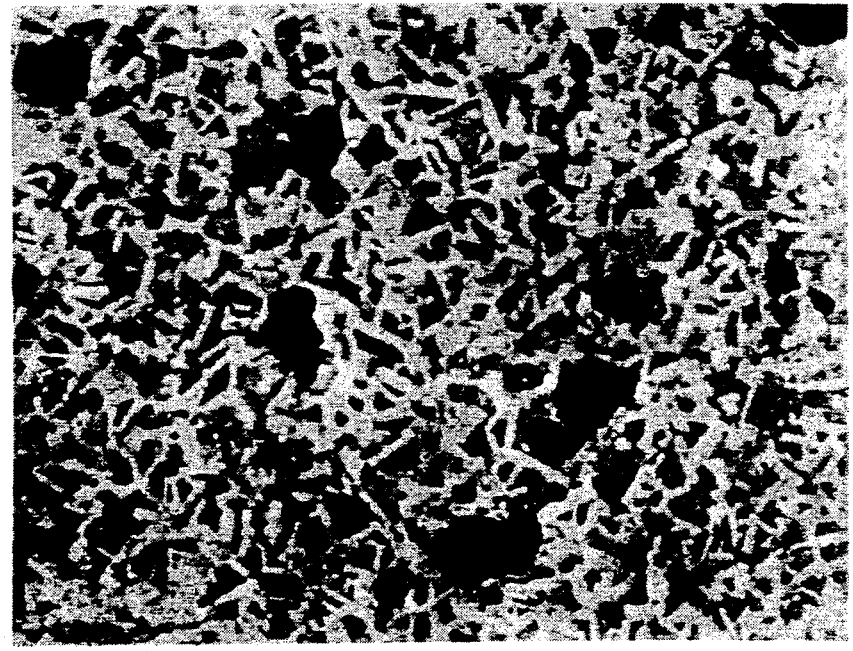
FIG. 7 is a photomicrograph at 400× magnification of a section of the ceramic matrix composite formed by the method of Example 18.

Moreover, FIGS. 6 and 7 are photomicrographs at 400x of sections from bodies formed according to this Example. Specifically, FIG. 6 is a photomicrograph of a cross-section of the body produced in Example 11 which utilized 320 grit (average particle diameter of about 32 $\mu$m) B₄C and −100 mesh, +200 mesh (particle diameter between about 75 $\mu$m and about 149 $\mu$m) Zr powder. The dark regions are porosity whereas the lighter region is a phase comprising ZBC. FIG. 7 is a photomicrograph of a cross-section of the body produced in Example 18 which utilized 500 grit (average particle diameter of about 17 $\mu$m) B₄C and −325 mesh (particle diameter less than about 45 $\mu$m) Zr powder. Similar to FIG. 6, the dark region in FIG. 7 is porosity and the surrounding region comprises ZBC.

Moreover, a comparison of FIGS. 6 and 7 as well as a review of Table IV demonstrates that the present invention permits forming a ZBC body possessing a desired amount of porosity.

The following Examples demonstrate that additives (e.g., silicon, titanium, etc.) may be added to a preform which is to be reacted with molten metal. The additive may be retained within the formed composites in order to modify or engineer the mechanical, physical, and thermal properties.

EXAMPLE 20

An about 2-inch square by about 0.4 inch thick preform was made by mixing about 40 grams of a mixture of about 2.6 wt% Si powder (−325 mesh, particle diameter less than about 45 $\mu$m, from Atlantic Equipment Engineers, Bergenfield, NJ) and about 97.4 wt% B₄C powder (1000 grit, average particle z diameter of about 5 $\mu$m, from ESK Engineered Ceramics, New Canaan, CT, lot M9-C) in a jar mill in a nalgene bottle for about 8 hours. The powder mixture was mixed with about 60 grams of an organic solvent (methylene chloride from J. T. Baker Co.) and milled together without stones. The milled composition was mixed with about 0.4 grams of an organic binder (Dow Experimental Ceramic Binder XUS 40303.00, lot 861230-2) and placed on a sieve shaker for about 0.5 hour. The composition was sediment cast into an about 2-inch square ATJ graphite crucible (one piece construction with rounded corners) and allowed to dry overnight. Further drying then took place in an oven at about 45° C. for about one hour and then at about 70° C. for about 2 hours.

The crucible with the preform was placed into a metal retort in a Lindberg resistance heated furnace which was twice evacuated and backfilled with argon gas. The argon gas was left flowing at a rate of about 2 liters/minute. The furnace was then heated from room temperature to about 200° C. in about 6 hours, from about 200° C. to about 350° C. at about 20° C. per hour and from about 350° C. to about 600° C. in about 5 hours. After reaching about 600° C., the furnace was cooled back to room temperature in about 10 hours. This produced a preform with a density of about 1.39 g/cm³.

The crucible was removed from the furnace and about 236 grams of zirconium metal sponge (Western Zirconium Co. nuclear grade, lot 4825) was placed on top of the preform. The assembly, comprising the crucible and its contents, was placed into a vacuum/inert atmosphere graphite resistance heated furnace which was evacuated and backfilled with argon gas. Under a vacuum, the furnace was heated to about 1000° C. in about 7 hours, at which time argon gas was allowed to flow through the furnace chamber at a rate of about 2 liters/minute. The furnace was further heated to about 1900° C. in about 9 hours, held at about 1900° C. for about one hour, cooled to about 1500° C. in about 8 hours and then cooled from about 1500° C. to room temperature in about 15 hours.

After the furnace reached room temperature, the assembly was removed from the furnace and the resultant body was removed from the crucible. Inspection revealed with the zirconium parent metal had reacted with the preform mixture of Si powder and $B_4C$ powder to form a self supporting composite body.

EXAMPLE 21

Example 20 was substantially followed by making a preform from about 40 grams of about 5.3 wt % Si powder and about 94.7 wt % $B_4C$ powder. The preform had a density of about 1.48 g/cm$^3$. About 231 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 22

Example 20 was substantially followed by making a preform from about 40 grams of about 8.2 wt % Si powder and about 92.8 wt % $B_4C$ powder. After sediment casting the mixture into the crucible, the crucible with the preform was placed into a metal retort in a Lindberg resistance heated furnace which was twice evacuated and backfilled with argon gas. The argon gas was left flowing at a rate of about 2 liters/minute. The furnace was then heated from room temperature to about 200° C. in about 5 hours, from about 200° C. to about 450° C. at about 20° C. per hour and from about 450° C. to about 600° C. in about 6 hours. After reaching about 600° C., the furnace was cooled back to room temperature in about 12 hours. This produced a preform with a density of about b 1.44 g/cm$^3$.

About 222 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 23

Example 20 was substantially followed by making a preform with about 40 grams of about 11.3 wt % Si powder and about 88.7 wt % $B_4C$ powder. The preform had a density of about 1.41 g/cm$^3$. About 216 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 24

Example 20 was substantially followed by making a preform with about 10 grams of about 2.6 wt % Si powder and about 97.4 wt % $B_4C$ powder. The powder mixture was mixed with about 12 grams of an organic solvent (methylene chloride from J. T. Baker Co.) and milled together without stones. The milled composition was mixed with about 0.1 grams of an organic binder (Dow Experimental Ceramic Binder XUS 40303.00, lot 861230-2) and placed on a sieve shaker for about 0.5 hour. The composition was sediment cast into an about 1-inch in diameter ATJ graphite crucible and then dried and treated in the furnace as described in Example 20. The preform was about 0.53-inch thick, with a density of about 1.33 g/cm$^3$.

About 53 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 25

Example 24 was substantially followed by making a preform with about 10 grams of about 5.4 wt % Si powder and about 94.6 wt % $B_4C$ powder. The about 0.5-inch thick preform had a density of about 1.40 g/cm$^3$. About 50 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 26

Example 24 was substantially followed by making a preform with about 10 grams of about 8.2 wt % Si powder and about 91.8 wt % $B_4C$ powder. The about 0.51-inch thick preform had a density of about 1.40 g/cm$^3$. About 51 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 27

Example 24 was substantially followed by making a preform with about 10 grams of about 11.3 wt % Si powder and about 88.7 wt % $B_4C$ powder. The about 0.5-inch thick preform had a density of about 1.43 g/cm$^3$. About 50 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 28

The procedure discussed in Example 20 was substantially followed, however, instead of silicon powder, titanium powder (−325 mesh, particle diameter less than about 45 μm, from Chemalloy Co.) was added to the $B_4C$ powder to make the preform. The preform was made by using about 40 grams of about 4.4 wt % Ti powder and about 95.6 wt % $B_4C$ powder. The about 0.5-inch thick preform had a density of about 1.17 g/cm$^3$. About 232 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 29

Example 28 was substantially followed by making a preform using about 40 grams of about 8.8 wt % Ti powder and about 91.2 wt % $B_4C$ powder. The about 2-inch by about 2-inch by about 0.4 inch thick preform had a density of about 1.32 $g/cm^3$. About 221 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 30

Example 28 was substantially followed by making a preform using about 40 grams of about 13.3 wt % Ti powder and about 86.7 wt % $B_4C$ powder. The about 2-inch by about 2-inch by about 0.4 inch thick preform had a density of about 1.33 $g/cm^3$. About 210 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 31

Example 28 was substantially followed by making a preform using about 40 grams of about 17.8 wt % Ti powder and about 82.2 wt % $B_4C$ powder. The about 2-inch by about 2-inch by about 0.4 inch thick preform had a density of about 1.40 $g/cm^3$. About 200 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal has reacted with the preform material to form a self-supporting composite body.

EXAMPLE 32

Example 28 was substantially followed by making a preform with about 10 grams of about 4.4 wt % Ti powder and about 95.6 wt % $B_4C$ powder. The powder mixture was mixed with about 12 grams of an organic solvent (methylene chloride from J. T. Baker Co.) and milled together without stones. The milled composition was mixed about 0.1 grams of an organic binder (Dow Experimental Ceramic Binder XUS 40303.00, lot 861230-2) and placed on a sieve shaker for several hours. The composition was sediment cast into an about 1-inch in diameter ATJ graphite crucible and then dried and treated in the metal retort in a Lindberg resistance heated furnace as described in Example 20. The preform was about 0.5-inch thick, with a density of about 1.39 $g/cm^3$. About 53 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 33

Example 32 was substantially followed by making a preform with about 10 grams of about 8.8 wt % Ti powder and about 91.2 wt % $B_4C$ powder. The about 0.5-inch thick preform had a density of about 1.36 $g/cm^3$. About 51 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 34

Example 32 was substantially followed by making a preform with about 10 grams of about 13.3 wt % Ti powder and about 86.7 wt % $B_4C$ powder. The about 0.5-inch thick preform had a density of about 1.38 $g/cm^3$. About 50 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 35

Example 32 was substantially followed by making a preform with about 10 grams of about 17.8 wt % Ti powder and about 82.2 wt % $B_4C$ powder. After sediment casting the mixture into the crucible, the crucible with the preform was placed into a metal retort in a Lindberg resistance heated furnace which was twice evacuated and backfilled with argon gas. The argon gas was left flowing at a rate of about 2 liters/minute. The furnace was then heated from room temperature to about 200° C. in about 5 hours, from about 200° C. to about 450° C. at about 20° C. per hour and from about 450° C. to about 600° C. in about 6 hours. After reaching about 600° C., the furnace was cooled back to room temperature in about 12 hours. This produced an about 0.5-inch thick preform which had a density of about 1.38 $g/cm^3$. About 50 grams of zirconium metal sponge was placed on top of the preform. After following substantially the same heating schedule as set forth in Example 20 in the same type of vacuum/inert atmosphere graphite resistance heated furnace, the resultant body was recovered. Inspection revealed that the zirconium metal had reacted with the preform material to form a self-supporting composite body.

EXAMPLE 36

This Example was conducted substantially the same as Examples 8-19 with the exception that the $B_4C$ mixture was formed by mechanically mixing about 10 grams of $B_4C$ powder (lot M-9 from ESK Engineered Ceramics, New Canaan, CT) with about 70 grams of about −50 mesh (particle diameter less than about 297 $\mu m$) zirconium powder (supplied by Atlantic Equipment Engineers, Bergenfield, NJ). The mixture was dry pressed in a steel die at a pressure of about 20,000 psi. After heating and cooling, as described about in Examples 8–19, the formed composite was subjected to an X-ray diffraction analysis to ascertain the degree of reaction between the zirconium and the $B_4C$.

An X-ray diffraction pattern of the formed ZBC composite was compared with an X-ray diffraction pattern of the $B_4C$ material utilized to form the preform. This comparison revealed that there was substantially no $B_4C$ remaining in the formed composite (i.e., there was a substantially complete reaction between the $B_4C$ and the zirconium powder).

What is claimed is:

1. A method of producing a self-supporting body comprising:
    mixing at least one combustible material and at least one particulate parent metal in at least a portion of a bed or mass comprising a boron carbide material to form a reaction mixture; and
    heating said reaction mixture to a temperature which is sufficient to permit the combustion of said combustible material, said temperature being approximately equal to or less than the melting temperature of said at least one particulate parent metal;
    heating said reaction mixture to a temperature above the melting point of said at least one particulate parent metal and reacting said at least one particulate parent metal with said boron carbide material in a substantially inert atmosphere to form at least one boron-containing compound; and
    continuing said reaction for a time sufficient to produce a self-supporting body comprising at least one parent metal boron-containing compound, said self-supporting body having porosity.

2. A method of producing a self-supporting body comprising:
    mixing at least one combustible material and particulate first parent metal with a boron carbide material to form a reaction mixture, said reaction mixture optionally containing at least one filler material;
    contacting said reaction mixture with a body of second parent metal to form a lay-up;
    heating said reaction mixture to a temperature which is sufficient to permit the combustion of said combustible material, said temperature being approximately equal to or less than the melting temperature of said particulate first parent metal and said second parent metal;
    heating said lay-up to a temperature which is above the melting point of said particulate first parent metal and said second parent metal to result in a reaction of the body of second parent metal with the boron carbide material and a reaction of the particulate first parent metal with the boron carbide material, thereby forming at least one boron-containing compound, and resulting in a self-supporting body having porosity.

3. The method according to claim 1, wherein said at least one particulate parent metal comprises at least two different particle sizes and said different particle sizes are mixed into different portions of the reaction mixture to permit the production of a self-supporting body which has graded porosity.

4. The method according to claim 1, wherein said at least one particulate parent metal comprises at least one metal selected from the group consisting of aluminum, zirconium, hafnium and titanium.

5. The method according to claim 2, wherein said particulate first parent metal comprises a metal selected from the group consisting of aluminum, zirconium, hafnium and titanium.

6. The method according to claim 3, wherein said at least one particulate parent metal comprises at least one metal selected from the group consisting of aluminum, zirconium, hafnium and titanium.

7. The method according to claim 1, wherein said self-supporting body is formed while in contact with at least one second body selected from the group consisting of a metal body, a ceramic body and a composite body to form a bond between the self-supporting body and the at least one second body.

8. The method according to claim 2, wherein said self-supporting body is formed while in contact with at least one second body selected from the group consisting of a metal body, a ceramic body and a composite body to form a bond between the self-supporting body and the at least one second body.

9. The method according to claim 3, wherein said self-supporting body is formed while in contact with at least one second body selected from the group consisting of a metal body, a ceramic body and a composite body to form a bond between the self-supporting body and the at least one second body.

10. A method of producing a self-supporting body comprising:
    mixing at least one combustible material with a bed or mass comprising a boron carbide material to form a mixture; and
    contacting said mixture with a body of parent metal to form a lay-up;
    heating said mixture to a temperature which is sufficient to permit the combustion of said combustible material, said temperature being approximately equal to or less than the melting temperature of said parent metal;
    heating said lay-up to a temperature which is above the melting point of said parent metal to result in a reaction of the body of parent metal with the boron carbide material, thereby forming at least one boron-containing compound, and resulting in a self-supporting body having porosity.

11. The method according to claim 1, wherein the initial concentration of at least one of said at least one combustible material and said at least one particulate parent metal is greater in one portion of said reaction mixture than in another portion of said reaction mixture, thereby resulting in a self-supporting body exhibiting a graded porosity.

12. The method according to claim 2, wherein the initial concentration of at least one of said at least one combustible material and said particulate first parent metal is greater in one portion of said reaction mixture than in another portion of said reaction mixture, thereby resulting in a self-supporting body exhibiting a graded porosity.

13. The method of claim 10, wherein said self-supporting body is formed while in contact with at least one second body selected from the group consisting of a metal body, a ceramic body and a composite body to form a bond between the self-supporting body and the at least one second body.

14. The method of claim 10, wherein the initial concentration of said at least one combustible material is greater in one portion of said mixture than in another portion of said mixture, thereby resulting in a self-supporting body exhibiting a graded porosity.

15. The method of claim 10, wherein said parent metal comprises a metal selected from the group consisting of aluminum, zirconium, hafnium, and titanium.

16. The method of claim 1, wherein said reaction mixture has the configuration of a self-supporting preform.

17. The method of claim 2, wherein said particulate first parent metal and said body of second parent metal are similar in composition.

18. The method of claim 2, wherein said particulate first parent metal and said body of second parent metal have different chemical compositions.

19. The method of claim 2, wherein said body of second parent metal comprises a metal selected from the group consisting of aluminum, zirconium, hafnium and titanium.

20. The method of claim 1, wherein said combustible material comprises at least one material selected from the group consisting of gelatin, corn starch and wax.

21. A method according to claim 1, wherein said reaction mixture further comprises at least one filler material.

22. A method according to claim 2, wherein said reaction mixture further comprises at least one filler material.

23. A method according to claim 10, wherein said mixture further comprises at least one filler material.

* * * * *

UNITED STATES PATENT AND TRADEMARK OFFICE
CERTIFICATE OF CORRECTION

PATENT NO. : 5,098,870
DATED : March 24, 1992
INVENTOR(S) : Terry Dennis Claar et al.

It is certified that error appears in the above-indentified patent and that said Letters Patent is hereby corrected as shown below:

Column 1, line 10: change "Ser. No. which" to --Ser. No. 07/551,750 which--.
Column 1, line 10: after "1990," delete "as 07/551,780".

Column 27, line 40: delete ", said reaction mixture".
Column 27, line 41: delete "optionally containing at least one filler material".

Signed and Sealed this

Twenty-third Day of April, 1996

Attest:

BRUCE LEHMAN

Attesting Officer  Commissioner of Patents and Trademarks